(12) United States Patent
Yoon

(10) Patent No.: US 11,848,631 B2
(45) Date of Patent: Dec. 19, 2023

(54) MOTOR-INTEGRATED INVERTER

(71) Applicants: HYUNDAI MOTOR COMPANY, Seoul (KR); KIA CORPORATION, Seoul (KR)

(72) Inventor: Jae Hoon Yoon, Gwacheon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 154 days.

(21) Appl. No.: 17/459,551

(22) Filed: Aug. 27, 2021

(65) Prior Publication Data

US 2022/0190764 A1 Jun. 16, 2022

(30) Foreign Application Priority Data

Dec. 10, 2020 (KR) ........................ 10-2020-0172634

(51) Int. Cl.
| | |
|---|---|
| H02M 7/08 | (2006.01) |
| H02P 23/28 | (2016.01) |
| H02K 11/33 | (2016.01) |
| H02M 7/537 | (2006.01) |
| H02P 27/06 | (2006.01) |
| H05K 7/14 | (2006.01) |

(52) U.S. Cl.
CPC .............. *H02P 23/28* (2016.02); *H02K 11/33* (2016.01); *H02M 7/537* (2013.01); *H02P 27/06* (2013.01); *H05K 7/1432* (2013.01)

(58) Field of Classification Search
CPC ......... H02P 23/28; H02P 27/06; H02K 11/33; H02K 11/215; H02M 7/537; H05K 7/1432
See application file for complete search history.

(56) References Cited

U.S. PATENT DOCUMENTS

2019/0386547 A1* 12/2019 Im ........................ H02K 11/33
2021/0083558 A1* 3/2021 Pae ....................... H02K 11/30

FOREIGN PATENT DOCUMENTS

| KR | 10-1803733 | 12/2017 |
|---|---|---|
| KR | 10-1885953 | 8/2018 |

* cited by examiner

*Primary Examiner* — Muhammad S Islam
(74) *Attorney, Agent, or Firm* — Fox Rothschild LLP

(57) ABSTRACT

A motor-integrated inverter is provided. The inverter includes a motor with a shaft disposed in a horizontal direction, and a power module configured to generate driving power for driving the motor and coupled to the motor in a direction in which the shaft is disposed.

15 Claims, 7 Drawing Sheets

MOTOR-INTEGRATED INVERTER

CROSS-REFERENCE TO RELATED APPLICATION

The present application claims the priority of Korean Patent Application No. 10-2020-0172634 filed on Dec. 10, 2020, the entire contents of which is incorporated herein for all purposes by this reference.

TECHNICAL FIELD

The present disclosure relates to a motor-integrated inverter, and more particularly, to a motor-integrated converter installed parallel to a motor at an end portion of a shaft of the motor.

BACKGROUND

Generally, a motor of an eco-friendly vehicle is driven by receiving electric power through an inverter. The inverter includes a power module provided with switching elements, a cooler for cooling the power module, a control board for performing ON/OFF control of the switching elements in the power module, and a capacitor for generating a direct-current (DC) voltage in an inverter circuit formed of the switching elements in the power module.

A conventional motor driving system has a structure in which a reducer for reducing a rotation of a shaft of a motor is installed on a side surface of the motor and an inverter is coupled to an upper portion of the motor.

In such a conventional motor driving system, when a torque required for the motor is changed and a size of the motor is increased in a direction of the side surface thereof, there occurs a problem in that an installation position and a connection structure of the inverter on the upper portion of the motor are changed.

In addition, the conventional motor driving system has a disadvantage in that the inverter protrudes to the upper portion of the motor so that an upper space of the motor cannot be utilized.

In addition, in the conventional motor driving system, since a coupling direction with the reducer disposed to be parallel in a direction of the shaft of the motor and a coupling direction of the inverter disposed in the upper portion of the motor are different from each other in a direction of bolt engagement during assembling so that there is a problem in that workability is degraded.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a motor-integrated inverter which is installed parallel to a motor in a direction of a shaft of the motor.

According to one aspect, there is provided a motor-integrated inverter including a motor including a shaft disposed in a horizontal direction, and an inverter coupled to the motor in a direction in which the shaft is disposed and including a power module configured to generate driving power for driving the motor.

In one form of the present disclosure, the inverter may further include a capacitor part configured to provide direct-current (DC) power to the power module, and a through-hole may be formed in a central portion of the capacitor part.

In one form of the present disclosure, the shaft may include an end portion protruding to the outside of a cover of the motor, and the end portion of the shaft may be inserted into the through-hole formed in the capacitor part.

In one form of the present disclosure, a cavity may be formed in the end portion of the shaft, and a permanent magnet may be disposed in one region of an inner circumferential surface of the cavity.

In one form of the present disclosure, the inverter may further include a control board in which a circuit configured to control switching elements included in the power module is implemented, and a hollow structure having a hollow and disposed between the control board and the cavity of the shaft by passing through the through-hole of the capacitor part, and a rotation angle sensor configured to detect a rotation angle of the motor by detecting a variation in a magnetic field due to the permanent magnet when the shaft is rotated may be disposed in a region in the cavity of the hollow of the hollow structure.

In one form of the present disclosure, a temperature sensor may further be disposed in the region in the cavity of the hollow of the hollow structure.

In one form of the present disclosure, a signal line through which a detected signal is transmitted from the rotation angle sensor may be disposed in the hollow of the hollow structure, and one end of the signal line may be connected to the control board.

In one form of the present disclosure, the inverter may further include a cooler disposed to be in contact with the power module.

In one form of the present disclosure, the cooler may have a U shape, and the power module may be disposed in regions corresponding to both sides of the shaft based on an extending line of the shaft.

In one form of the present disclosure, the cooler includes tubes which are formed in a double-layer structure and through which cooling water flows to the power module, and the power module may be disposed between the tubes having the double-layer structure.

In one form of the present disclosure, the inverter may further include a bus bar of the power module through which motor driving power output from the power module is transmitted, and the bus bar of the power module may extend from the power module to an upper portion of the capacitor part.

In one form of the present disclosure, the bus bar of the power module may be engaged with a bus bar of the motor, which is connected to an input terminal receiving driving power of each phase of the motor, in the upper portion of the capacitor part.

In one form of the present disclosure, the bus bar of the motor may be exposed to the outside of the motor through a through-hole formed in the cover of the motor in a direction in which the shaft is disposed.

In one form of the present disclosure, the inverter may further include a cover attached to a surface of the motor and configured to seal components constituting the inverter.

In one form of the present disclosure, a sealing gasket may be provided in a region in which the cover of the motor is in contact with the capacitor part.

In one form of the present disclosure, a hook protrusion configured to limit a position by being hooked to an edge of the through-hole of the capacitor part may be formed on an outer circumferential surface of the hollow structure, and a sealing gasket may be provided between the through-hole of the capacitor part and the hook protrusion.

In one form of the present disclosure, the motor-integrated inverter may further include a reducer coupled to the motor to be parallel to the inverter and the motor in a direction opposite to a position at which the inverter is disposed and configured to change a rotational speed of the shaft and output the changed rotational speed.

DRAWINGS

The above and other objects, features and other advantages of the present disclosure will be more clearly understood from the following detailed description when taken in conjunction with the accompanying drawings, in which.

DETAILED DESCRIPTION

Hereinafter, a motor-integrated inverter according to various forms will be described in detail with reference to the accompanying drawings.

Figure 1:
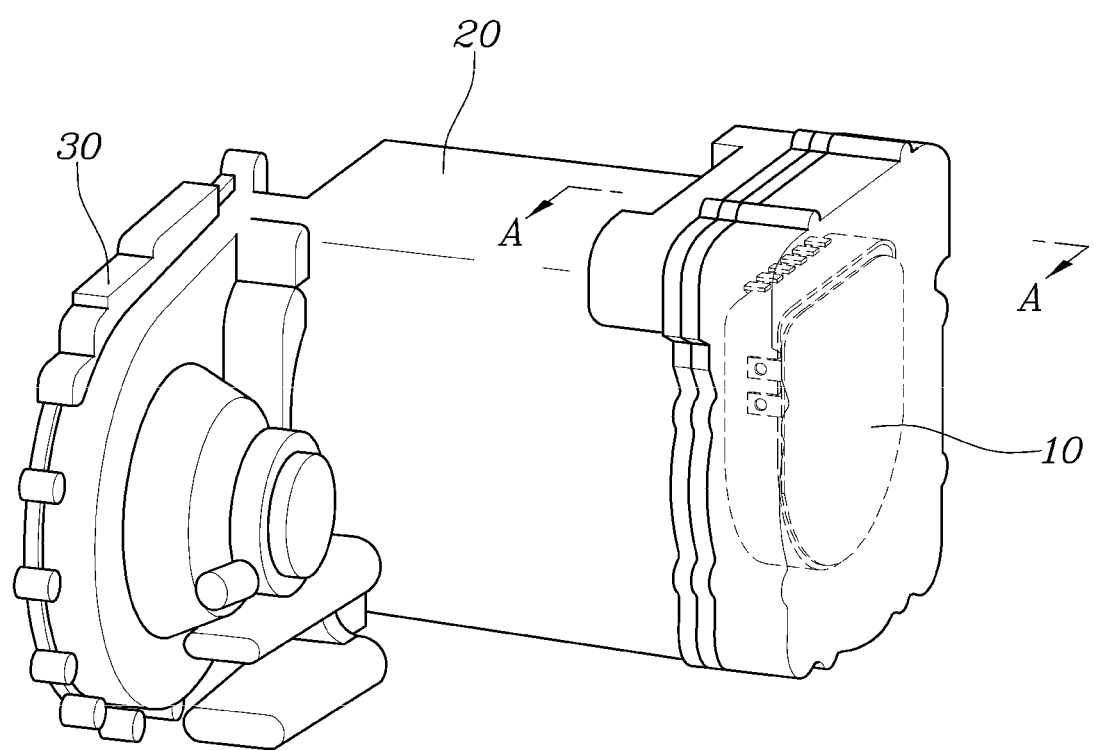
FIG. 1 is a perspective view illustrating an outer shape of a motor-integrated inverter in one form of the present disclosure.
Figure 2:
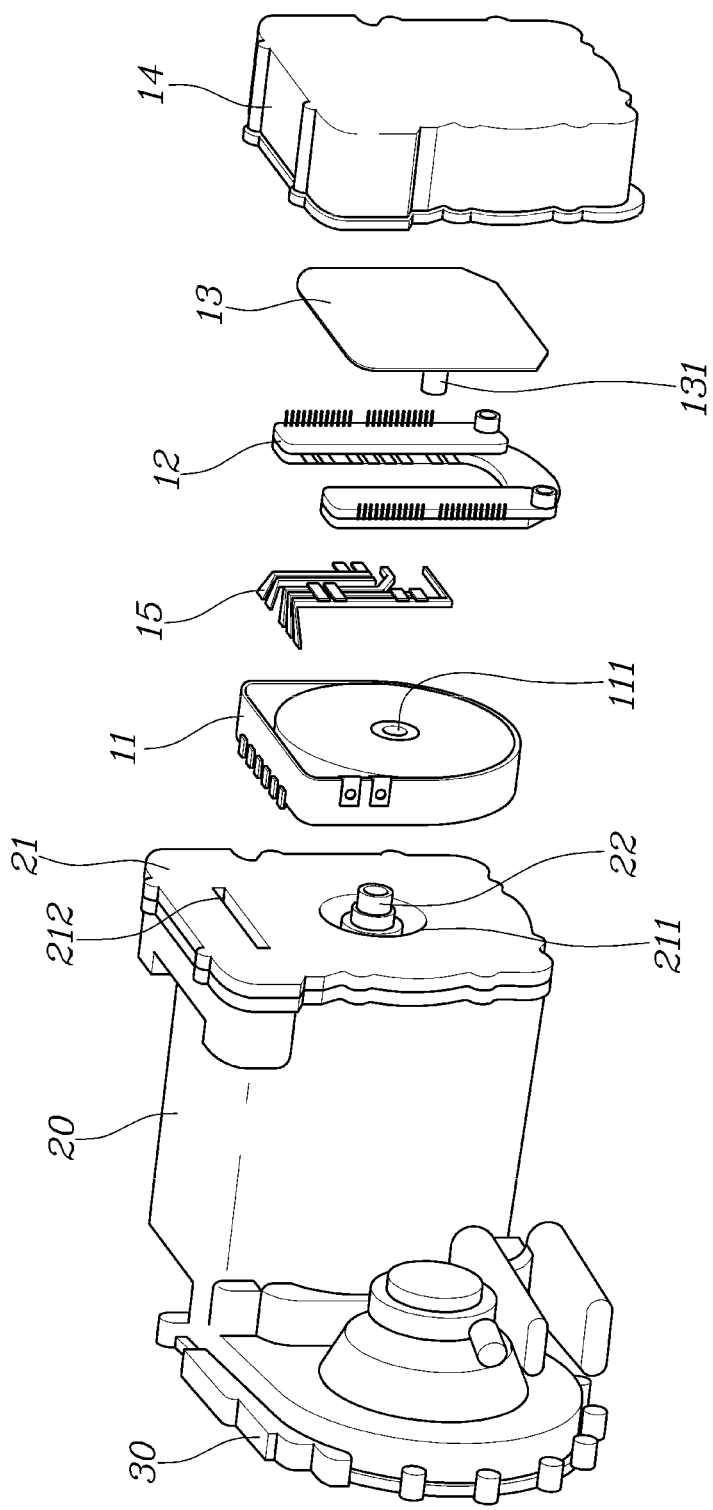
FIG. 2 is a developed view illustrating the motor-integrated inverter shown in FIG. 1 in one form of the present disclosure.
Figure 3:
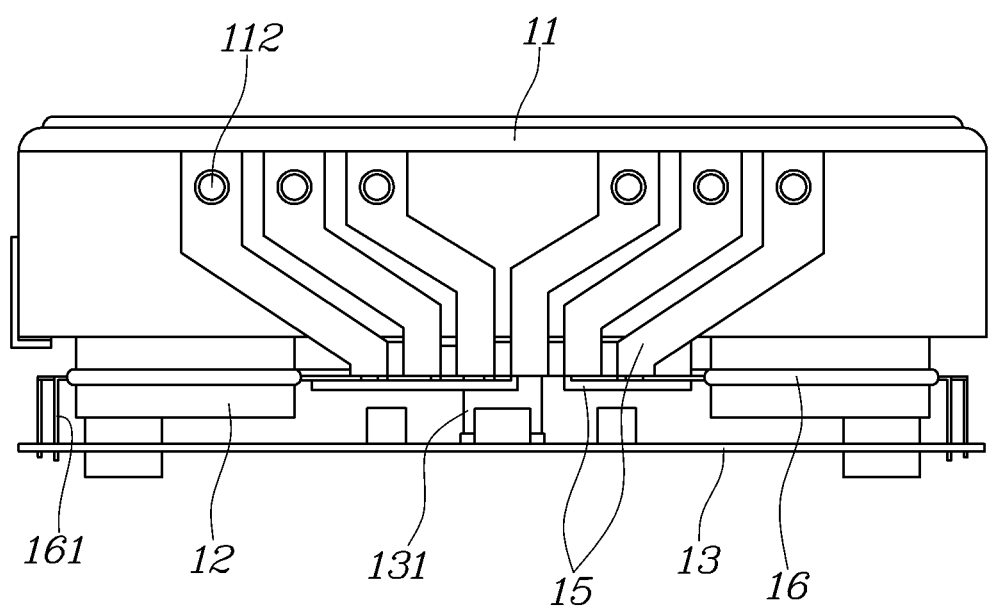
FIG. 3 is a plan view illustrating a state in which a cover of the motor-integrated inverter shown in FIG. 1 is removed in one form of the present disclosure.
Figure 4:
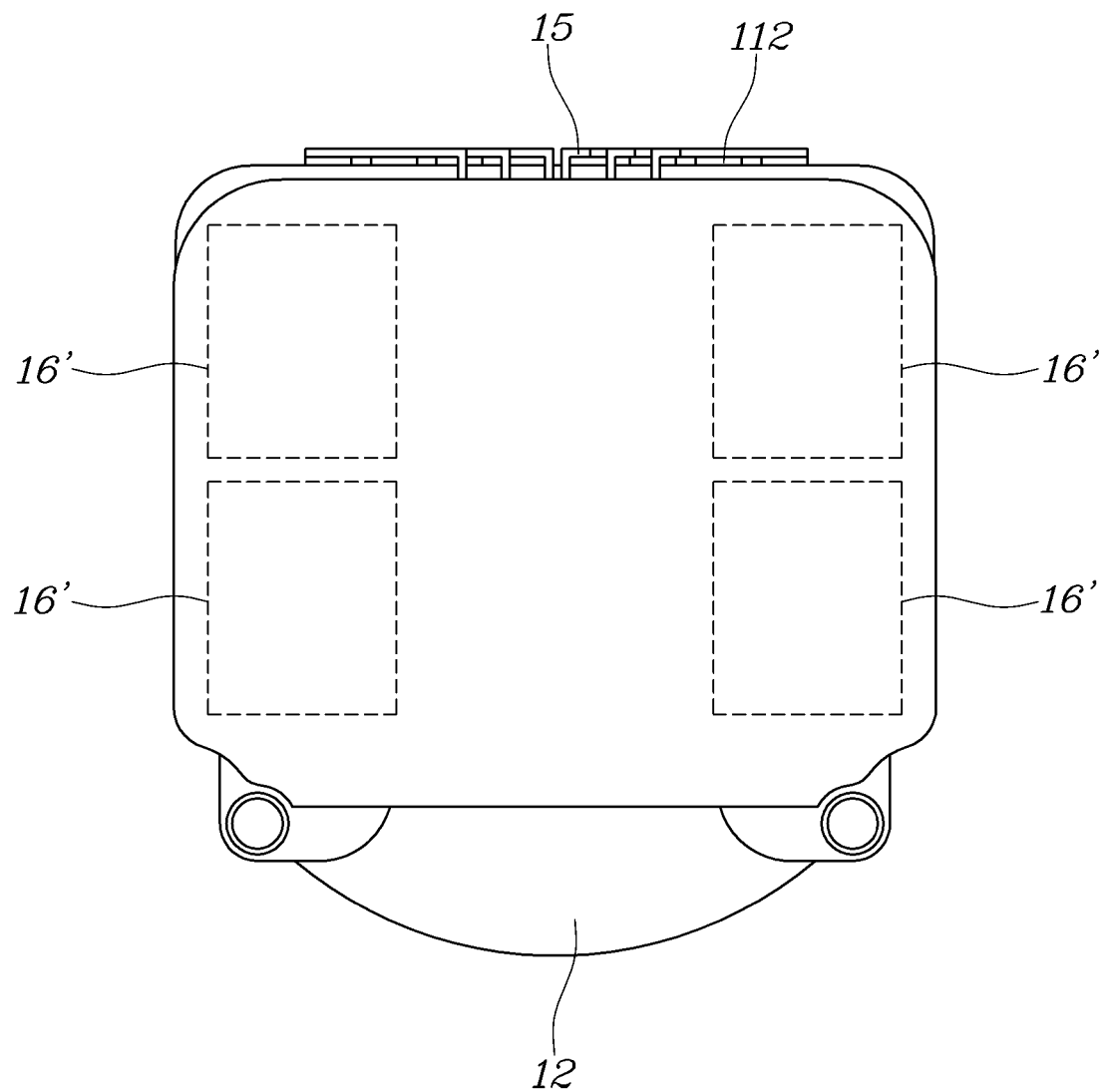
FIG. 4 is a front view illustrating a state in which a cover of the motor-integrated inverter shown in FIG. 1 is removed in one form of the present disclosure.
Figure 5:
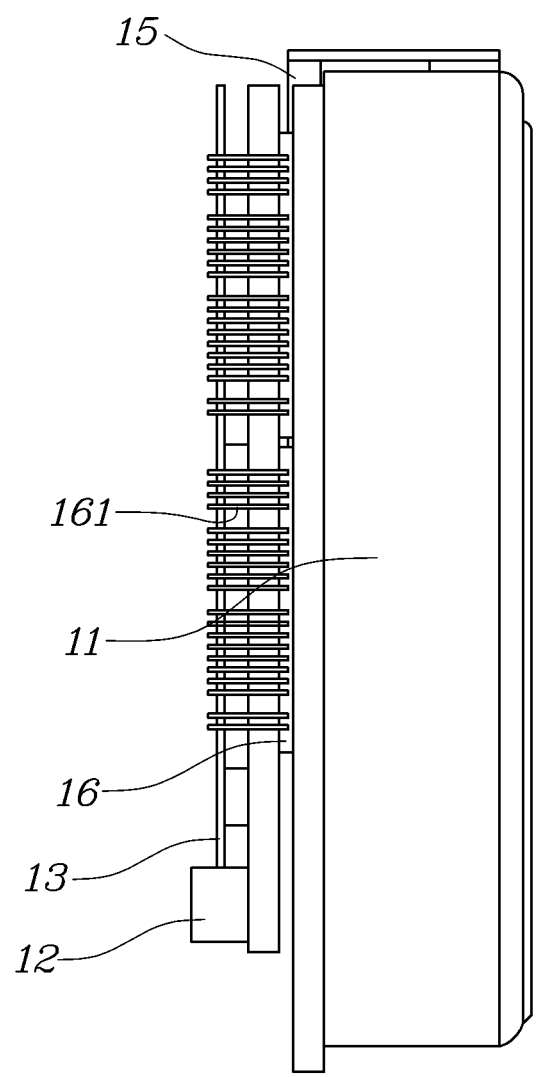
FIG. 5 is a side view illustrating a state in which a cover of the motor-integrated inverter shown in FIG. 1 is removed in one form of the present disclosure.

FIG. 1 is a perspective view illustrating an outer shape of a motor-integrated inverter in one form of the present disclosure, and FIG. 2 is a developed view illustrating the motor-integrated inverter shown in FIG. 1 in one form of the present disclosure. In addition, FIG. 3 is a plan view illustrating a state in which a cover of the motor-integrated inverter shown in FIG. 1 is removed in one form of the present disclosure, FIG. 4 is a front view illustrating a state in which a cover of the motor-integrated inverter shown in FIG. 1 is removed in one form of the present disclosure, and FIG. 5 is a side view illustrating a state in which a cover of the motor-integrated inverter shown in FIG. 1 is removed in one form of the present disclosure.

Referring to FIGS. 1 to 5, a motor-integrated inverter 10 in one form of the present disclosure may be disposed in the form of being coupled to a motor 20 in a direction parallel to a shaft of the motor 20. In addition, some forms of the present disclosure may further include a reducer 30 which is coupled to the motor 20 to be parallel to the inverter 10 and the motor 20 in a direction opposite to a position at which the inverter 10 is disposed, and is configured to change a rotational speed of the shaft of the motor 20 and output the changed rotational speed.

More specifically, the motor-integrated inverter 10 in one form of the present disclosure may include a capacitor part 11 attached to a motor cover 21 on one side of the motor 20 and having a hollow into which one end portion of a shaft 22 of the motor 20 is inserted, a power module 16 having switching elements, a cooler 12 configured to cool the power module, a control board 13 connected to a hollow structure 131 inserted into a cavity formed in the shaft 22 of the motor 20, and a cover 14 bonded to the motor cover 21 and configured to seal the capacitor part 11, the cooler 12, and the control board 13. In FIG. 2, a reference numeral "15" denotes a bus bar 15 configured to transmit electric power of each phase, which is output from the power module 16.

The capacitor part 11 may have a donut shape in which a through-hole 111 passing through a front surface and a rear surface of the capacitor part 11 is formed. The capacitor part 11 may have a structure including a cover and a capacitor installed in the cover, and a bus bar engagement part 112 configured to form an electrical connection with each phase of the motor 20 may be formed on an upper surface of the cover. The bus bar engagement part 112 is a part in which a motor bus bar connected to a driving power input terminal of each phase of the motor 20 through a through-hole 212 formed in the motor cover 21 of the motor 20 and the bus bar 15 to which driving power output from the power module 16, which will be described below, is transmitted are mutually engaged.

The shaft 22 of the motor 20, which is exposed to the outside of the cover 21 through a through-hole 211 formed in the cover 21 of the motor 20, may be inserted into the through-hole 111 formed in a region corresponding to the shaft 22 of the motor 20 at a central portion of the capacitor part 11.

The cooler 12, which cools the power module 16, may be disposed in a structure of being in surface contact with the capacitor part 11 on a surface of the motor 20 in a direction opposite to the capacitor part 11. The cooler 12 may be a component for cooling the power module 16 and may have a structure with a hollow in which the hollow structure 131 may be disposed. In the example shown in FIGS. 1 to 5, the cooler 12 may have a U-shaped structure, and the power module 16 including switching elements and constituting the inverter 10 may be disposed in a region 16' corresponding to both sides of the shaft 22 based on an extending line of the shaft 22 on which the hollow structure 131 is disposed.

In the cooler 12, tubes through which cooling water flows may be formed in a double-layer structure in the region 16' in which the power module 16 is disposed, and the power module 16 may be disposed between the tubes having the double-layer to cool the power module 16 from both sides thereof. In addition, the cooler 12 may form a surface contact with the capacitor part 11 to cool the capacitor part 11.

The bus bar 15 which transmits the motor driving power output from the power module 16 to the motor 20 may be disposed between the regions 16', in which the power module 16 is disposed. One end of the bus bar 15 may be connected to a motor driving power output terminal of the power module 16 and, as described above, the other end of the bus bar 15 may be engaged with a bus bar connected to the input terminal of each phase of the motor 20 at the bus bar engagement part 112 located in an upper portion of the capacitor part 11.

The bus bar engagement part 112 may have a shape of bolt-engaging a bus bar provided from the motor 20 with the bus bar 15 in the inverter 10 or have a shape of forming a mutual electrical connection the bus bar and the bus bar 15 through a connector which is provided in advance.

The control board 13 implementing a control circuit for controlling the power module 16 may be provided on the surface of the cooler 12 in the direction opposite to the capacitor part 11. The control board 13 may include a circuit board, various integrated circuits (ICs) configured to generate control signals for controlling the power module 16 so as to drive the motor 20, and passive/active electrical and electronic devices. To this end, a conductive pattern (not shown) formed on the control board 13 may be electrically connected to a signal lead 161 of the power module 16.

In particular, the control board 13 implements a circuit for controlling a speed or a torque of the motor 20 and preventing overheating of the motor 20. To this end, the control board 13 should receive information on a rotor position and a temperature of the motor 20.

In some forms of the present disclosure, a sensor for detecting the rotor position of the motor 20 and a sensor for detecting the temperature of the motor 20 are not provided in the motor 20 itself, and the hollow structure 131 connected to the control board 13 is used. That is, the control board 13 has a structure in which a rotor position sensor and a temperature sensor are provided at one end of the hollow structure 131, and a signal connection line connecting sensors to the control board 13 is disposed in a hollow of the hollow structure 131.

Figure 6:
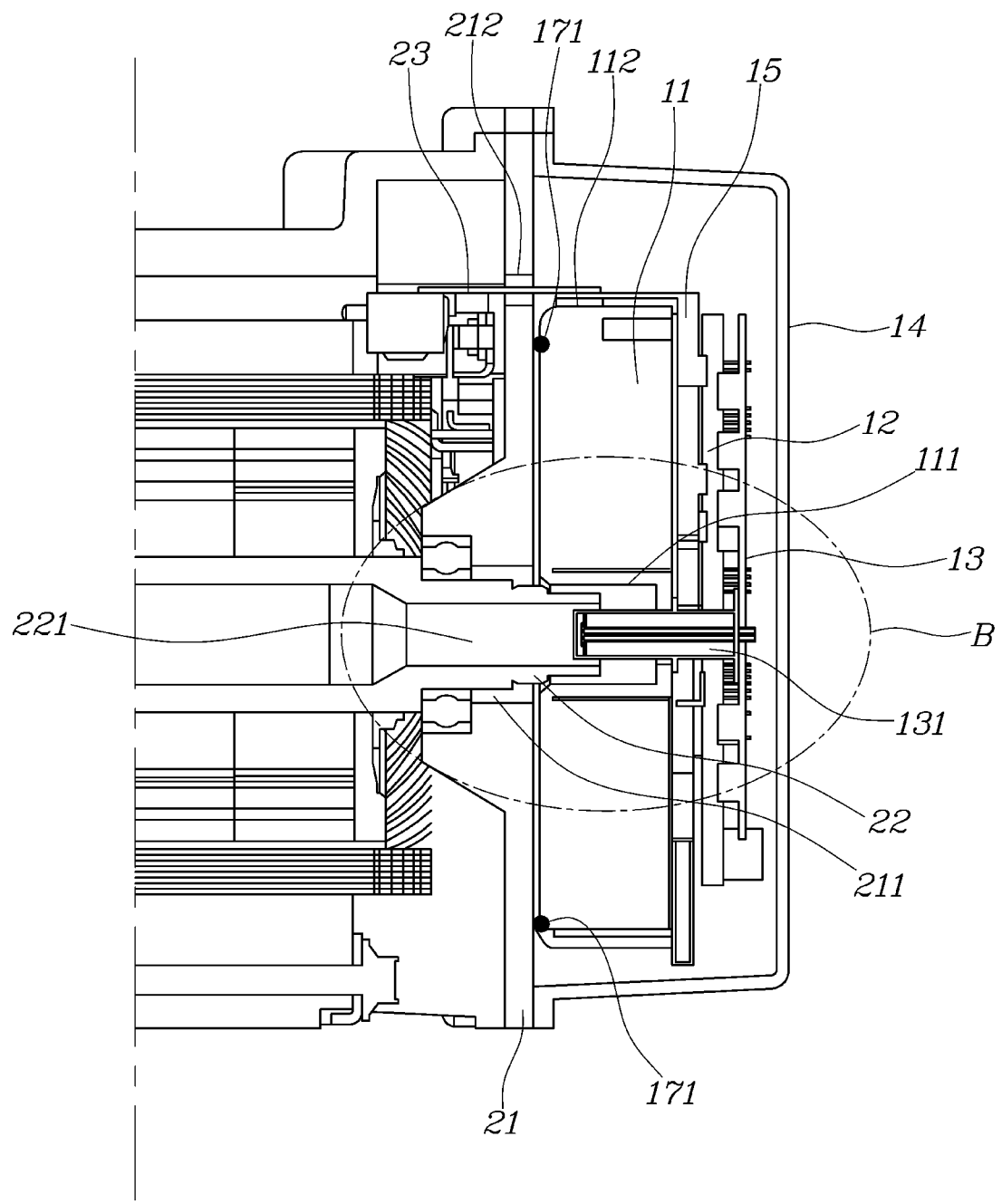
FIG. 6 is a cross-sectional view taken along line A-A' of FIG. 1.
Figure 7:
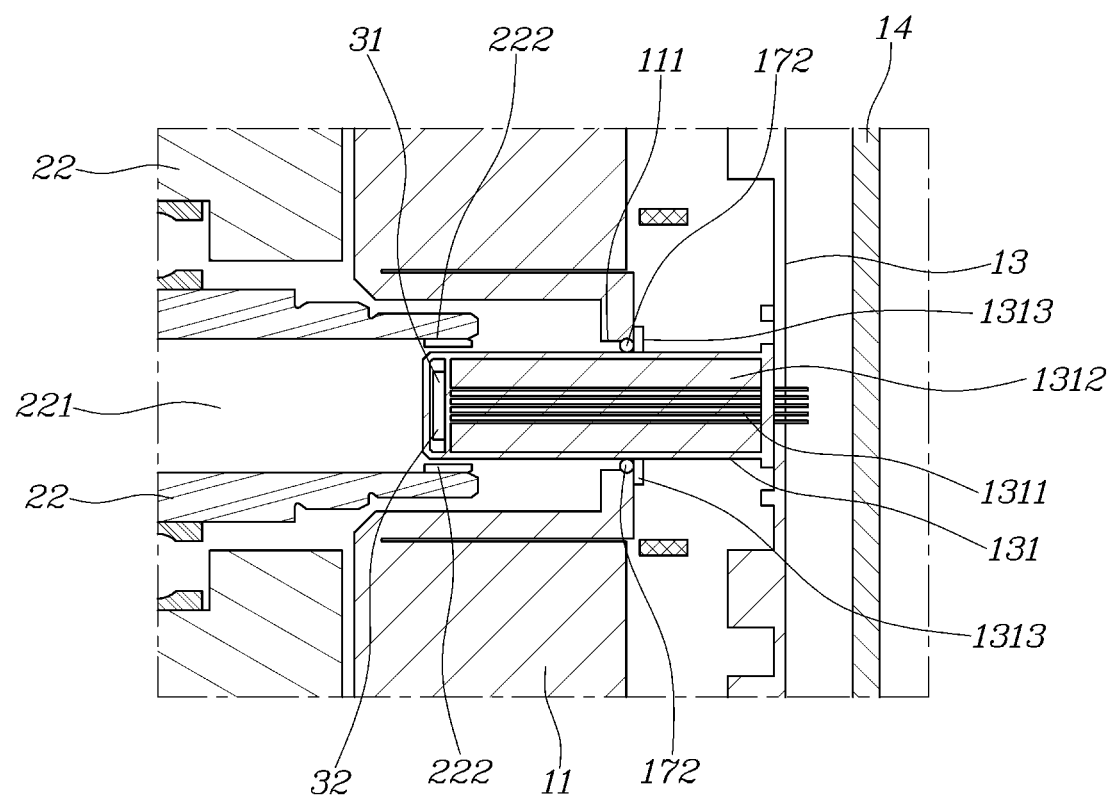
FIG. 7 is an enlarged cross-sectional view illustrating an area indicated by a reference numeral "B" of FIG. 6.

FIG. 6 is a cross-sectional view taken along line A-A' of FIG. 1, and FIG. 7 is an enlarged cross-sectional view illustrating an area indicated by a reference numeral "B" of FIG. 6. In particular, FIG. 7 illustrates a cross-sectional view in which unnecessary components are omitted so as to show a clearer connection relationship between the motor, the hollow structure, and the control board.

Referring to FIGS. 6 and 7, one end of the shaft 22 of the motor 20 may protrude to the outside of the motor cover 21 through the through-hole 211 formed in the motor cover 21. A cavity 221 may be formed at one end of the shaft 22 of the motor 20 from a direction of the inverter 10 to a direction of the motor 20, and a magnetic permanent magnet 222 may be disposed at a preset position on an inner circumferential surface of an inlet of the cavity 221.

The hollow structure 131 may be disposed in the form of extending from the control board 13 in a direction of the shaft 22 of the motor 20 and may be disposed to pass through the through-hole 111 formed in the capacitor part 11.

A motor rotation angle sensor 31 and a temperature sensor 32 may be disposed at the end portion of the shaft 22 in the hollow structure 131.

The rotation angle sensor 31 is a sensor for detecting a rotor position (a rotation angle) of the motor 20 and may detect a variation in magnetic field due to the permanent magnet 222 disposed at the inlet of the cavity 221 of the shaft 22 when the shaft 22 is rotated, thereby detecting the rotation angle. Thus, a length of the hollow structure 131 may be determined such that the rotation angle sensor 31 is disposed at a position corresponding to a position at which the permanent magnet 222 is disposed in the shaft 22.

In addition, in order to limit a position of the hollow structure 131, a hook protrusion 1313 may be formed on an outer circumferential surface of the hollow structure 131 to be hooked to an edge region of the through-hole 111 of the capacitor part 11.

The temperature sensor 32 is a component for detecting the temperature of the motor 20.

In order to transmit information on the rotation angle and the temperature which are detected by the rotation angle sensor 31 and the temperature sensor 32, a signal line 1311 may be disposed in a hollow 1312 of the hollow structure 131. One end of the signal line 1311 may be connected to the rotation angle sensor 31 and the temperature sensor 32 disposed at the shaft 22 of the hollow structure 131, and the other end of the signal line 1311 may be connected to the control board 13 by passing through the hollow 1312 of the hollow structure 131.

For reference, FIG. 6 shows a structure of a bus bar 23 of the motor 20 connected to the driving power input terminal of each phase of the motor 20 and exposed to the an upper portion of the capacitor part 11. The bus bar 23 of the motor 20 may be exposed to the outside of the motor 20 through the through-hole 212 formed in the motor cover 21 of the motor 20 and may be engaged with the bus bar 15 of the power module 16 at the bus bar engagement part 112 located on an upper surface of a cover of the capacitor part 11.

In one form of the present disclosure, a plurality of sealing gaskets may be provided to maintain airtightness of the motor.

Referring to FIG. 6, an O-ring type sealing gasket 171 may be provided in a region in which the motor cover 21 of the motor 20 is in contact with the capacitor part 11.

In addition, referring to FIG. 7, in order to prevent airtightness from being destroyed through the through-hole 111 of the capacitor part 11, the O-ring type sealing gasket 171 may be provided at the edge of the through-hole 111 of the capacitor part 11. The O-ring type sealing gasket 171 may be disposed between the hook protrusion 1313 formed in the hollow structure 131 and the edge of the through-hole 111 to form airtightness.

When compared to the conventional inverter disposed above the motor, the above-described motor-integrated inverter according to the various forms of the present disclosure may have various advantages by being disposed parallel to the motor in a horizontal direction.

For example, in the inverter disposed above the motor according to a related art, when an output required for the motor is increased and thus a design is changed to increase a size of the motor in the horizontal direction, a design change should be made together with a connection structure of the inverter. However, the motor-integrated inverter in some forms of the present disclosure has an advantage in that, even when a size of the motor is increased in the horizontal direction, the same connection structure may be maintained so that a design change are unnecessary. This may reduce a time and the number of people which are required for a motor system design. In particular, this may exhibit a greater effect in a system which requires a large number of power modules by employing a plurality of inverters.

In addition, the motor-integrated inverter in some forms of the present disclosure may secure a space above the motor, thereby securing a space in which various other additional parts may be installed.

In addition, in the motor-integrated inverter in some forms of the present disclosure, a resolver inserted into the motor and a separate temperature sensor are omitted, and the hollow structure including sensors connected to the control board is provided in a space in the shaft of the motor shaft to directly provide sensed information to the control board so that a contact failure due to a connection of a connector connection may be solved, and thus cost reduction and quality improvement may be achieved.

In addition, in the motor-integrated inverter in some forms of the present disclosure, the reducer, the motor, and the inverter may be assembled in one direction so that assemblability may be improved. In particular, when the inverter is located in an upper portion, a separate connection bus bar for connecting the power module of the inverter to a bus bar, which outputs driving power to a three-phase bus bar of the motor should be added. However, in the motor-integrated inverter in some forms of the present disclosure, the connection structure between the bus bar of the power module in the inverter and the three-phase bus bar of the motor may be directly made in the inverter so that a bus bar connection structure may be simplified and a connection length may be reduced.

In accordance with a motor-integrated inverter, there is an advantage in that, even when a size of a motor is increased in a horizontal direction, the same connection structure can be directly maintained so that, when the motor-integrated inverter is installed above a motor, a required design change is unnecessary. Thus, in accordance with the motor-integrated inverter, a time and the number of people which are required for a motor system design can be reduced and, in particular, a greater effect in a system which requires a large number of power modules can exhibit by employing a plurality of inverters.

In addition, in accordance with the motor-integrated inverter, a space above the motor can be secured so that a space in which various other additional parts are installed can be secured.

In addition, in accordance with the motor-integrated inverter, a resolver inserted into the motor and a separate temperature sensor can be omitted, and a hollow structure including sensors connected to a control board in a space in the shaft of the motor shaft can directly provide sensed information to the control board so that a contact failure due to a connection of a connector connection can be solved, and thus cost reduction and quality improvement can be achieved.

In addition, in accordance with the motor-integrated inverter, a reducer, the motor, and the inverter can be assembled in one direction so that assemblability can be improved. In particular, when the inverter is located in an upper portion, a separate connection bus bar for connecting a power module of the inverter to a bus bar, which outputs driving power, to a three-phase bus bar of the motor should be added. However, in accordance with the motor-integrated inverter, a connection structure between the bus bar of the power module in the inverter and a three-phase bus bar of the motor can be directly made in the inverter so that a bus bar connection structure can be simplified and a connection length can be reduced.

The effects obtained by the present disclosure is not limited to the above-mentioned effects and other effects which are not mentioned can be clearly understood by those skilled in the art to which the present disclosure pertains from the above description.

Although some forms of the present disclosure have been described and illustrated, those skilled in the art will appreciate that various alternations and modifications are possible without departing from the appended claims.

What is claimed is:

1. A motor-integrated inverter, comprising:
   a motor having a shaft disposed in a horizontal direction;
   a power module configured to generate driving power for driving the motor and coupled to the motor in a direction in which the shaft is disposed;
   a capacitor configured to provide direct-current (DC) power to the power module; and
   a through-hole formed in a central portion of the capacitor;
   wherein an end portion of the shaft protrudes to an outside of a cover of the motor; and
   wherein the end portion of the shaft is inserted into the though-hole.

2. The motor-integrated inverter of claim 1, wherein:
   a cavity is formed in the end portion of the shaft, and
   a permanent magnet is disposed in one region of an inner circumferential surface of the cavity.

3. The motor-integrated inverter of claim 1, wherein the inverter further includes: a cooler configured to contact the power module.

4. The motor-integrated inverter of claim 1, wherein the inverter further includes:
   a bus bar of the power module through which motor driving power output from the power module is transmitted, wherein the bus bar of the power module extends from the power module to an upper portion of the capacitor.

5. The motor-integrated inverter of claim 1, wherein the inverter further includes:
   a cover attached to a surface of the motor and configured to seal components of the inverter.

6. The motor-integrated inverter of claim 1, wherein:
   a sealing gasket is provided in a region in which the cover of the motor is in contact with the capacitor.

7. The motor-integrated inverter of claim 1, further comprising:
   a reducer coupled to the motor to be parallel to the inverter and the motor in a direction opposite to a position at which the inverter is disposed, wherein the reducer is configured to change a rotational speed of the shaft and output the changed rotational speed.

8. The motor-integrated inverter of claim 2, wherein the inverter further includes:
   a control board having a circuit configured to control switching elements included in the power module;
   a hollow structure disposed between the control board and the cavity and configured to pass through the through-hole; and
   a rotation angle sensor configured to detect a rotation angle of the motor by detecting a variation in a magnetic field when the shaft is disposed in the cavity.

9. The motor-integrated inverter of claim 3, wherein:
   the cooler has a hollow, and
   the power module is disposed in regions corresponding to both sides of the shaft based on an extending line of the shaft.

10. The motor-integrated inverter of claim 3, wherein:
    the cooler includes tubes formed in a double-layer structure and through which cooling water flows to the power module, and
    the power module is disposed between the tubes.

11. The motor-integrated inverter of claim 4, wherein:
    the bus bar of the power module is engaged with a bus bar of the motor, wherein the bus bar of the motor is connected to an input terminal that is configured to receive driving power of the motor in the upper portion of the capacitor.

12. The motor-integrated inverter of claim 8, wherein a temperature sensor is further disposed in the cavity.

13. The motor-integrated inverter of claim 8, wherein:
    a signal line through which a detected signal is transmitted from the rotation angle sensor is disposed in the hollow structure, and
    an end of the signal line is connected to the control board.

14. The motor-integrated inverter of claim 8, wherein:
    a hook protrusion configured to limit a position by attaching to an edge of the through-hole of the capacitor, where the hook protrusion is formed on an outer circumferential surface of the hollow structure, and a sealing gasket is provided between the through-hole of the capacitor and the hook protrusion.

15. The motor-integrated inverter of claim 11, wherein:

the bus bar of the motor is exposed to the outside of the motor through a through-hole formed in a cover of the motor in a direction in which the shaft is disposed.

\* \* \* \* \*